United States Patent
Toohey et al.

(10) Patent No.: US 10,885,741 B2
(45) Date of Patent: Jan. 5, 2021

(54) UNIFIED DIGITAL WALLET

(71) Applicant: Bally Gaming, Inc., Las Vegas, NV (US)

(72) Inventors: John P. Toohey, Boca Raton, FL (US); Cherie M. Duncan, Cumming, GA (US)

(73) Assignee: SG Gaming, Inc., Las Vegas, NV (US)

( * ) Notice: Subject to any disclaimer, the term of this patent is extended or adjusted under 35 U.S.C. 154(b) by 0 days.

(21) Appl. No.: 16/795,902

(22) Filed: Feb. 20, 2020

(65) Prior Publication Data
US 2020/0193769 A1    Jun. 18, 2020

Related U.S. Application Data

(63) Continuation of application No. 15/269,227, filed on Sep. 19, 2016, now Pat. No. 10,607,442.

(60) Provisional application No. 62/232,588, filed on Sep. 25, 2015.

(51) Int. Cl.
| | |
|---|---|
| *G07F 17/32* | (2006.01) |
| *G06Q 20/36* | (2012.01) |
| *G06Q 20/38* | (2012.01) |
| *G06Q 50/34* | (2012.01) |
| *G06F 16/25* | (2019.01) |

(52) U.S. Cl.
CPC ........ *G07F 17/3244* (2013.01); *G06F 16/254* (2019.01); *G06Q 20/3678* (2013.01); *G06Q 20/381* (2013.01); *G06Q 50/34* (2013.01); *G07F 17/3241* (2013.01)

(58) Field of Classification Search
CPC ............. G07F 17/3244; G07F 17/3241; G06F 16/254; G06Q 20/3678; G06Q 20/381; G06Q 50/34
See application file for complete search history.

(56) References Cited

U.S. PATENT DOCUMENTS

2012/0296951 A1 * 11/2012 Roberts ..................... G06F 9/52
709/201

FOREIGN PATENT DOCUMENTS

| WO | WO 2015/066478 A1 | 5/2015 | |
|---|---|---|---|
| WO | WO-2015066478 A1 * | 5/2015 | ......... G07F 17/3244 |

* cited by examiner

*Primary Examiner* — Laura A Gudorf
(74) *Attorney, Agent, or Firm* — Nixon Peabody LLP

(57) ABSTRACT

A unified wallet manager (UWM) virtualized as a single virtual service in which all transactions relative to the UWM are treated as immutable facts permanently stored in append-only queues or ledgers from the time of their creation. A rules engine reads conversion requests in request calls to the service, and determines which rule or rules to apply to convert funds from one ledger to another, in the same or different vertically scaled gaming systems. The UWM is a peer of other vertical gaming systems, and the gaming systems access the UWM via an API server and data egresses from the UWM through an ETL process from a database cluster. The immutable queues allow for data reconstruction using any desired data model. The ledger stores funds of many different types, including real money, points, play money, and others. Third parties can integrate with the UWM through an integration hub connected to the UWM.

21 Claims, 4 Drawing Sheets

UNIFIED DIGITAL WALLET

CLAIM OF PRIORITY AND CROSS-REFERENCE TO RELATED APPLICATION

This application is a continuation of U.S. patent application Ser. No. 15/269,227, filed Sep. 19, 2016, now allowed, which claims the benefit of priority to U.S. Provisional Patent Application No. 62/232,588, which was filed on Sep. 25, 2015, both of which are incorporated herein by reference in their entireties.

COPYRIGHT

A portion of the disclosure of this patent document contains material which is subject to copyright protection. The copyright owner has no objection to the facsimile reproduction by anyone of the patent disclosure, as it appears in the Patent and Trademark Office patent files or records, but otherwise reserves all copyright rights whatsoever.

FIELD OF THE INVENTION

The present invention relates generally to software architecture and systems, and, more particularly, to a software architecture and system for a unified digital wallet for use with one or more gaming systems.

BACKGROUND OF THE INVENTION

Digital wallets are gaining acceptance, but the architecture and design of conventional digital wallets are constrained or disadvantaged in several respects. First, a conventional digital wallet is not scalable across multiple vertical computer systems, partly due to internalized coupling constraints programmed into the wallet's design and partly due to the wallet's subservient position in the layers of the software architecture. Second, conventional digital wallets are vulnerable to system crashes or data corruption, which can cast doubt on the integrity of the data when full functionality is restored. Third, conventional digital wallets do not offer seamless conversion from various types of funds or fund equivalents across different vertical systems. Fourth, data associated with conventional digital wallets is typically organized according to a specific data model, which does not integrate seamlessly with systems that use a different data model. Fifth, digital wallets used in distributed systems are plagued by resource contention, requiring additional overhead to ensure data integrity.

SUMMARY OF THE INVENTION

A unified wallet manager (sometimes generally referred to herein as a wallet) is provided over a representational state (REST) service utilizing a hypertext transfer protocol (HTTP) or HTTPS and considered a peer relative to other vertical gaming systems. The wallet is a standalone relative to other vertical gaming systems, which means that the wallet possesses its own storage, process space, security layer, and memory, and data flows in to a single virtual service and egresses out through an extract-transform-load (ETL) process operating on a distributed database management system. Transactions using a unified wallet manager are treated as immutable facts that are memorialized forever within queues or logs that record requests, responses, and stored funds (such as real money and points having real value like loyalty or bonus points, progressive pools, and play or virtual money having no exchange value per se). Request (e.g., GET, POST) and response calls relative to the wallet occur mutually asynchronously and are completely decoupled from one another such that a response is not dependent upon when a request call is made to the wallet service.

Any new transaction entry, once committed to a queue within the wallet, can never be overwritten, moved, deleted, or modified in any way. New entries are always appended to the last entry logged in a queue, and the queue is traversed by computing logical offsets based on a current offset and message size, as opposed to utilizing expensive message IDs. Every wallet becomes an immutable timeline history record of facts or an immutable accounting of all ledger transactions that involved each wallet from inception to the present. It can be viewed as an infinite or ever-expanding series of transaction events where any historical event or set of events can be peered into through a window applied to the series by computationally calculating logical offsets in the queue without using any message IDs. Mutating or conflicting states are thus completely avoided, eliminating contention and promoting confidence in the reliability and integrity of the transactions passing through the wallet.

A rules engine applies rules to convert ledgers not only from one ledger type to another but also from one type of gaming system (e.g., casino gaming system) to a completely different type of gaming system (e.g., sports betting gaming system) and cross-ledger currency conversions (e.g., from real money to loyalty points or from bonus points to play money or virtual credits). Rules or conditions on the conversions are also applied, such as 500 loyalty points for every $5 spent, but if spent on this date and between these times, 5×500 loyalty points are awarded). The rules engine can also create new value to the ledger from nothing without any corresponding exchange value, such as if a player uses a wagering game terminal in March during a time range, award that player $5, which adds $5 to the real money ledger for that player's wallet. Conversions can be embedded into request calls to the wallet, and converted by the rules engine accordingly either cross-ledger and/or across multiple vertical gaming systems. Different conversion rates for different gaming system are also specified by the rules engine, because a loyalty point at a particular casino gaming system can worth more or less compared to the same loyalty point at a sports betting gaming system or even a competitor's casino gaming system. Rules can be chained together and can inherit properties or attributes from other rules, which allows different gaming systems to share ledger types that previously have not been sharable. Actions can be inferred given a set of facts from the immutable queues based on the rules by the (infinite) rules engine.

Payloads can accompany funds as they traverse through the wallet, allowing gaming system callers to the wallet to attach to any wallet transaction any payload with its own metadata that will be retained in the wallet and can be retrieved at will unscathed. In this way, the wallet can also act as a pass-through storage for wallet-related data in a way that is completely transparent and agnostic to the wallet. Because all transactions are memorialized, all associated payloads are also retained forever in the immutable queues as a permanent historical record for any gaming system consumer. Examples of payloads include an electronic receipt of a transaction, a uniform resource indicator (URI) link to a promotion or coupon, a lottery ticket, or any other indicia of a transaction involving funds. An external (to the wallet) daemon job can be written to inspect a payload for a lottery ticket, for example, to check if a winning number is associated with the lottery ticket.

Treatment of the wallet as a co-equal standalone peer of all vertical gaming systems, memorializing all transactions passing through the wallet as immutable and unalterable facts, virtualizing all services within the wallet as a single virtual service so that the wallet is treated as a service, among other attributes result in a highly scalable, fault-tolerant, extensible, contention-free, flexible architecture for deployment of a digital wallet in any multi-gaming ecosystem, regardless of system constraints or requirements. Another way to view the wallet is that its ledgers provide a single source of truth for all transactions conducted relative to the wallet. For example, data stored in the wallet is completely agnostic as to the data model that defines how the data should be organized. One gaming system may demand a row-column type of data model, but another gaming system may demand a column-row or graph type of data model. In other words, the data in the wallet is not beholden to any particular data model. Because the entire history of transactions or any subset thereof can be recreated at will, even if originally a data model of a first type were applied to the wallet data, when recreated, a different data model of another type can be applied to the recreated data by simply writing a new extract-load-transform (ETL) job, allowing different perspectives to emerge, to conform the wallet data to the requirements of another vertical gaming system, or to rebuild the system automatically, all without ever having to recertify the wallet.

According to an aspect of the present invention, a standalone digital wallet manager managing a plurality of balances of funds associated with a plurality of players of one or more gaming systems, includes: one or more processors; one or more memory devices coupled to the one or more processors; one or more data storage devices utilizing one or more data models; an input interface and an output interface; a plurality of software services operated by the one or more processors and deployed over a representational state transfer (REST) service utilizing a hypertext transfer protocol (HTTP), each of the software services responding to request or response calls over the REST service; a request queue receiving asynchronous request calls from at least one of the plurality of software services via the input interface; a response queue holding response calls from at least one of the plurality of software services for communication to the output interface; a storage queue feeding the one or more data storage devices the plurality of balances of funds associated with the plurality of players of one or more gaming systems; and a ledger service coupled to the storage queue, the response queue, and the request queue, the ledger service managing access to the balances of funds stored in the storage queue. Each of the request queue, the response queue, and the storage queue is immutable such that all new entries to the queue are appended sequentially to the queue and no edits or deletion of any existing entries in the queue is permitted.

The wallet manager can further include a rules engine coupled to the ledger service, the rules engine including a plurality of conversion rates and a corresponding rule associated with each of the conversion rates. Each of the conversion rates can indicate a conversion exchange value between at least two funds of different types, and each of the corresponding rules can indicate one or more conditions that must be satisfied to convert between the at least two funds of different types. At least one of the conversion rates can indicate a conversion exchange value between a first fund of a first type associated with a first of the one or more gaming systems and a second fund of a second type associated with a second of the one or more gaming systems, wherein the first and the second gaming systems are of different types. The different types are distinct ones of a casino gaming system, a lottery gaming system, a sports betting gaming system, or a social gaming system.

The wallet manager can further include a rules engine coupled to the ledger service. The rules engine can include a rule that creates a new value to add to one of the plurality of balances of funds associated with one of the plurality of players. The new has no exchange value when created. The rule can indicate at least one condition to be satisfied by the one of the plurality of players interacting with any one or more of the one or more gaming system and an extent of the new value to be added when the at least one condition is satisfied.

One of the plurality of software services can be a read-only vault service that exposes data obtained or derived from the storage queue to the output interface. The data can be exposed via an extract, transform, and load (ETL) process operating on a distributed database management system. All request or response calls relative to the input or output interface can pass through the request queue or the response queue. All messages stored in the request queue or the response queue can be exposed by their respective logical offsets in the queue.

An identifier (ID) of a new message to be appended to the request queue or the response queue can be computed by adding a length of a current message to its logical offset without associating any explicit message-IDs to any of the messages stored in the request queue or the response queue. The request queue can be a plurality of request queues including any two or more of the following queues: a wager queue, a win queue, a purchase queue, an award queue, a deposit queue, and a withdraw queue. The wager queue can store requests to deduct an amount of money from a requested one of the balances of funds associated with a requested one of the players, the deducted amount of money corresponding to an amount of a wager placed by the requested player on one of the one or more gaming systems. The win queue can store requests to deposit an amount of money to a requested one of the balances of funds associated with a requested one of the players. The deposited amount of money can correspond to an amount of a win awarded to the requested player by one of the one or more gaming systems. The purchase queue can store requests to purchase a number of virtual credits by the requested player in one of the one or more gaming systems. The deposit queue can store requests to deposit an amount of real money into the requested one of the balances of funds. The withdraw queue can store requests to withdraw an amount of real money from the requested one of the balances of funds.

At least one of the request calls can include a payload associated with at least one of the funds passing through the storage queue. The payload can include a uniform resource locator (URL) link or a uniform resource indicator (URI) or a receipt or other indicia of a transaction involving funds. At least one of the response calls can include the same payload in unaltered form.

The one or more gaming systems can include a first gaming system of a first type and a second gaming system of a second type distinct from the first type. The first type can be a casino gaming system, a lottery gaming system, a sports betting gaming system, or a social gaming system, and the second type can be any other of the first type.

The immutability of the request, response, and storage queues can allow data stored in the one or more data storage devices to be organized according to or characterized by any data model. Data stored in the one or more data storage devices can be independent of whichever data model is used to organize or characterize the data. The one or more data storage devices can include one or more mass storage devices.

According to another aspect of the present disclosure, a computer-implemented method is provided of managing a plurality of balances of funds associated with a plurality of players of one or more gaming systems. The method includes: operating a plurality of software services by one or more processors; deploying the plurality of software services over a representational state transfer (REST) service utilizing a hypertext transfer protocol (HTTP), each of the software services responding to request or response calls over the REST service; receiving in a request queue asynchronous request calls from at least one of the plurality of software services via an input interface; holding response calls in a response queue from at least one of the plurality of software services for communication to an output interface; a storage queue feeding one or more data storage devices the plurality of balances of funds associated with the plurality of players; managing access to the balances of funds stored in the storage queue by a ledger service coupled to the storage queue, the response queue, and the request queue, wherein each of the request queue, the response queue, and the storage queue is immutable such that all new entries to the queue are appended sequentially to the queue and no edits or deletion of any existing entries in the queue is permitted.

The method can further include: providing a plurality of rules in a rules engine coupled to the ledger service. The rules engine can include a plurality of conversion rates. Each of the conversion rates can indicate a conversion exchange value between at least two funds of different types. Each of the corresponding rules can indicate one or more conditions that must be satisfied to convert between the at least two funds of different types.

At least one of the conversion rates can indicate a conversion exchange value between a first fund of a first type associated with a first of the one or more gaming systems and a second fund of a second type associated with a second of the one or more gaming systems. The first and the second gaming systems can be of different types. The different types can be distinct ones of a casino gaming system, a lottery gaming system, a sports betting gaming system, or a social gaming system.

The method can further include creating a new value by a rule operated by a rules engine coupled to the ledger service to add to one of the plurality of balances of funds associated with one of the plurality of players. The new can have no exchange value when created. The rule can indicate at least one condition to be satisfied by the one of the plurality of players interacting with any one or more of the one or more gaming system and an extent of the new value to be added when the at least one condition is satisfied.

The method can further include transferring all request or response calls relative to the input or output interface through the request queue or the response queue. All messages stored in the request queue or the response queue can be exposed by their respective logical offsets in the queue.

An identifier (ID) of a new message to be appended to the request queue or the response queue can be computed by adding a length of a current message to its logical offset without associating any explicit message-IDs to any of the messages stored in the request queue or the response queue.

The request queue can be a plurality of request queues including any two or more of the following queues: a wager queue, a win queue, a purchase queue, an award queue, a deposit queue, and a withdraw queue. The wager queue can store requests to deduct an amount of money from a requested one of the balances of funds associated with a requested one of the players, the deducted amount of money corresponding to an amount of a wager placed by the requested player on one of the one or more gaming systems. The win queue can store requests to deposit an amount of money to a requested one of the balances of funds associated with a requested one of the players. The deposited amount of money can correspond to an amount of a win awarded to the requested player by one of the one or more gaming systems. The purchase queue can store requests to purchase a number of virtual credits by the requested player in one of the one or more gaming systems. The deposit queue can store requests to deposit an amount of real money into the requested one of the balances of funds. The withdraw queue can store requests to withdraw an amount of real money from the requested one of the balances of funds.

At least one of the request calls can include a payload associated with at least one of the funds passing through the storage queue, the payload including a uniform resource locator (URL) link or a URI or a receipt or other indicia of a transaction involving funds. At least one of the response calls can include the same payload in unaltered form.

The method can further include: organizing data stored in the one or more data storage devices according to a first data model; reconstructing data using at least a subset of information stored in at least the storage queue; and organizing the reconstructed data according to a second data model different from the first data model. Data stored in the one or more data storage devices can be independent of whichever data model is used to organize or characterize the data.

Additional aspects of the invention will be apparent to those of ordinary skill in the art in view of the detailed description of various embodiments, which is made with reference to the drawings, a brief description of which is provided below.

Figure 1:
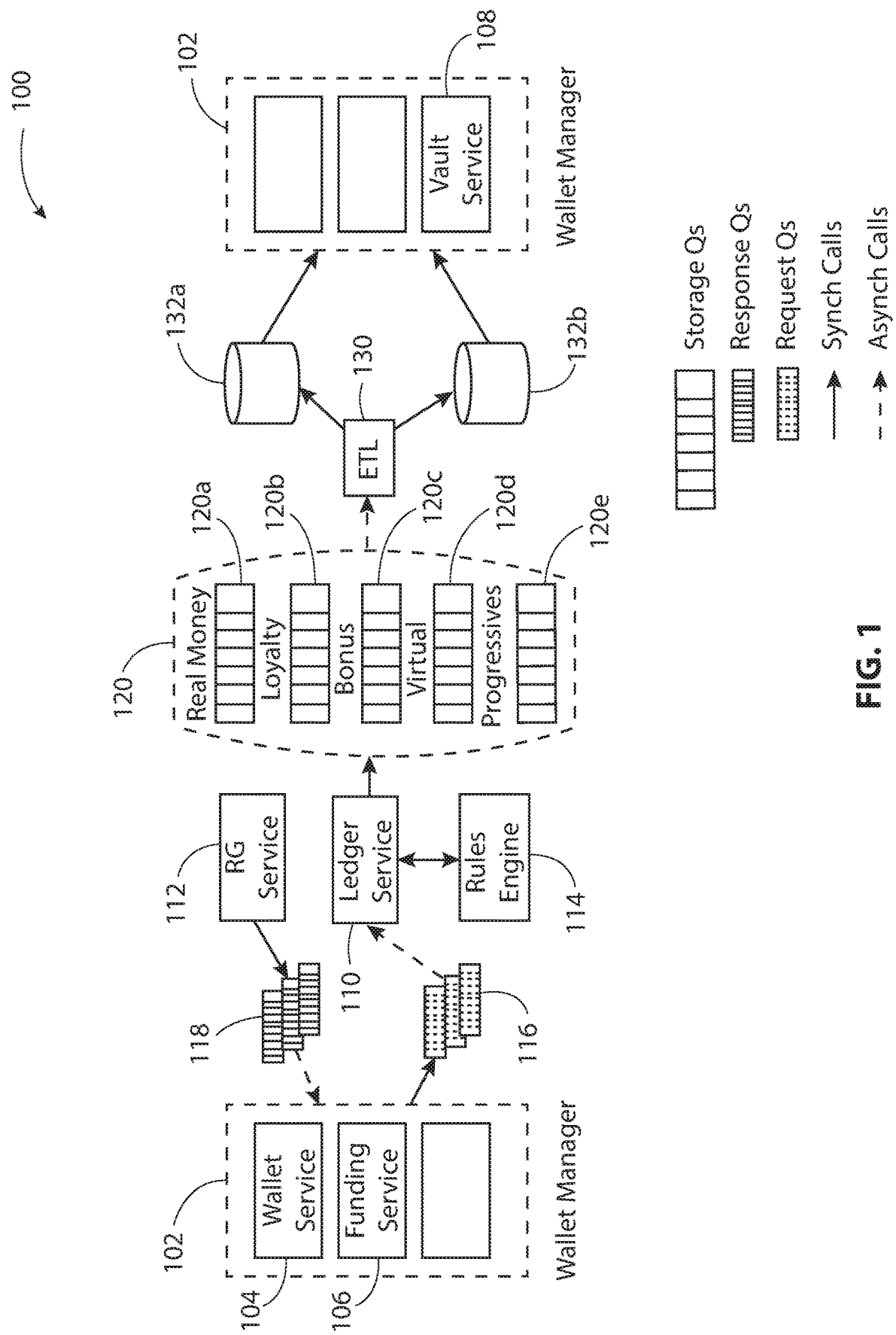
FIG. 1 is a functional block diagram of an architecture for a unified wallet manager according to an aspect of the present disclosure.

While the invention is susceptible to various modifications and alternative forms, specific embodiments have been shown by way of example in the drawings and will be described in detail herein. It should be understood, however, that the invention is not intended to be limited to the particular forms disclosed. Rather, the invention is to cover all modifications, equivalents, and alternatives falling within the spirit and scope of the invention as defined by the appended claims.

DETAILED DESCRIPTION

While this invention is susceptible of embodiment in many different forms, there is shown in the drawings and will herein be described in detail preferred embodiments of the invention with the understanding that the present disclosure is to be considered as an exemplification of the principles of the invention and is not intended to limit the broad aspect of the invention to the embodiments illustrated. For purposes of the present detailed description, the singular includes the plural and vice versa (unless specifically disclaimed); the words "and" and "or" shall be both conjunctive and disjunctive; the word "all" means "any and all"; the word "any" means "any and all"; and the word "including" means "including without limitation."

For purposes of the present detailed description, the terms "wagering game," "casino wagering game," "casino gaming system," "sports betting," "gambling," "lottery," "slot game," "casino game," and the like include games in which a player places at risk a sum of money or other representation of value, whether or not redeemable for cash, on an event with an uncertain outcome, including without limitation those having some element of skill. In some embodiments, a wagering game or sports betting game involves wagers of real money, as found with typical land-based or online casino games. In other embodiments, the wagering game additionally, or alternatively, involves wagers of non-cash values, such as virtual currency, and therefore may be considered a social or casual game, such as would be typically available on a social networking web site, other web sites, across computer networks, or applications on mobile devices (e.g., phones, tablets, etc.). When provided in a social or casual game format, the wagering game may closely resemble a traditional casino game, or it may take another form that more closely resembles other types of social/casual games.

This disclosure refers to a digital unified wallet manager (UWM) 100, shown in FIG. 1, which is a combined interface exposed by multiple services, which are aggregated into a single virtual service. The UWM 100 provides a secure, auditable, scalable gaming wallet capable of managing real money, with multiple currency support, bonus points or promotions, loyalty points, virtual credits, and play or virtual money for multiple vertical gaming systems. For convenience, the term "wallet" or wallet service can be used herein to refer to the UWM 100 generally or to the single virtualized service of multiple services aggregated as the UWM 100 and exposed via an application program interface (API). In some aspects, a wallet as used herein does not breach compliance with the Payment Card Industry (PCI) security standards, which means that no credit or debit card numbers, whether in encrypted form or otherwise, ever pass through or are stored in the UWM 100 (although an encrypted PCI-compliant token can be stored in the UWM 100). The vertical computer gaming systems include any one or more of a casino gaming system, a sports betting gaming system, a lottery gaming system, and a social gaming system. Each of these computer gaming systems are treated as vertical systems relative to one another, and each has its own independent processing resources, storage and memory resources, security systems, and so forth. In this way, both the UWM 100 and each of the gaming systems is considered architecturally to be a first class citizen in the gaming ecosystem. By "computer" gaming system it is meant that the gaming systems operate under control of one or more computers. The terms manager, service, virtual, protocol, engine, proxy, server, topics, queue, log, window, publish-subscribe, message, data store, program, data model, interface, database, ID, link, system, cluster, event, hub, daemon, computer, applications, and their grammatical variants used throughout this disclosure have their ordinary meanings as understood by those of ordinary skill in the art of software architecture and design. The terms credits, winnings, wager, real money, play money, virtual credits, loyalty points, bonus points, lottery, social gaming, exchange value, casino, sports betting, progressive, pool, and deposit have their ordinary meanings as understood by those of ordinary skill in the art of gaming systems, including casino gaming systems, sports betting gaming systems, lottery gaming systems, and social gaming systems.

A "fund" or funds as used herein encompasses real money (e.g., real world currency), loyalty points, bonus points, progressive pools, virtual or play money, and credits including virtual credits, and representations thereof. In the case of play money, play money may or may not have a real-world exchange value. For example, play or virtual money can be used on social gaming systems, and real money can be used to purchase play money, although the reverse does not necessarily hold true, i.e., play money cannot necessarily be exchanged for real money. In fact, when traversing from a social gaming system to a lottery gaming system, for example, play money cannot be converted into corresponding real money. A balance of funds refers to a total value of funds accumulated by a player and stored in a wallet. The wallet described herein can store many different types of funds for many different players transacting these funds at many different gaming systems.

The UWM 100 has various attributes, some of which are summarized here and described in more detail below. The UWM 100 is stand-alone and completely independent of the consuming vertical applications of the various gaming systems. The UWM 100 is deployed over a representational state transfer (REST) service utilizing a hypertext transfer protocol (HTTP), and can be self-hosted in a filesystem. HTTP herein includes HTTPS.

Some workhorses of the UWM 100 include a Wallet Service 104, a Ledger Service 110, a Funding Service 106, a Vault Service 108, with supporting services such as a Currency Service, a Loyalty Conversion Service, and a Timer Service. A Rules Engine 114 is deployed to enable the Ledger Service 110 to convert or award currencies between the various Ledgers 120. The funding of digital wallets 100 with real money and withdrawals of real money are handled by the Funding Service 106 and not the Wallet Service 104. The UWM 100 can be accessed via an application programming interface (API) proxy server. The Wallet Manager 102 is the combined interfaces exposed by the Wallet Service 104, the Funding Service 106, and the Vault Service 108. These services can be aggregated into a single virtual service by the API proxy server. When the wallet is consolidated as a single virtual service, inbound data flows are consumed at an input interface thereof and outbound data flows egress from an output interface of the virtual service.

The unified virtual service of the UWM 100 is a highly available and fault-tolerant service, which can use asynchronous queues and publish-subscribe mechanisms. The asynchronous queues can be categorized into four main types: request, response, sync and storage queues.

Request Queues 116

Request queues 116 receive requests for processing from the Wallet Service 104, and the Funding Service 106. Neither of these services 104, 106 will directly call any other service. All communications between the Wallet Manager 102 and the Ledger Service 110 will be via request queues 116 in an asynchronous manner. These request queues 116 have a sliding window for message expiration.

In this example, there are six request queues 116, but fewer or more request queues can be present.

Wager request queue: All requests to the Wallet Manager 102 for a deduction of real money for the purpose of placing a wager on a gaming system 202 (FIG. 2) that permits wagering, such as a casino gaming system, a sports betting gaming system, or a lottery gaming system. In other words, the wager request queue stores requests to deduct an amount of money from a requested one of the balances of funds (such as the real money ledger 120*a*) associated with a requesting player. The deducted amount of money corresponds to an amount of a wager placed by the requesting player on a casino gaming system 202.

Figure 3:
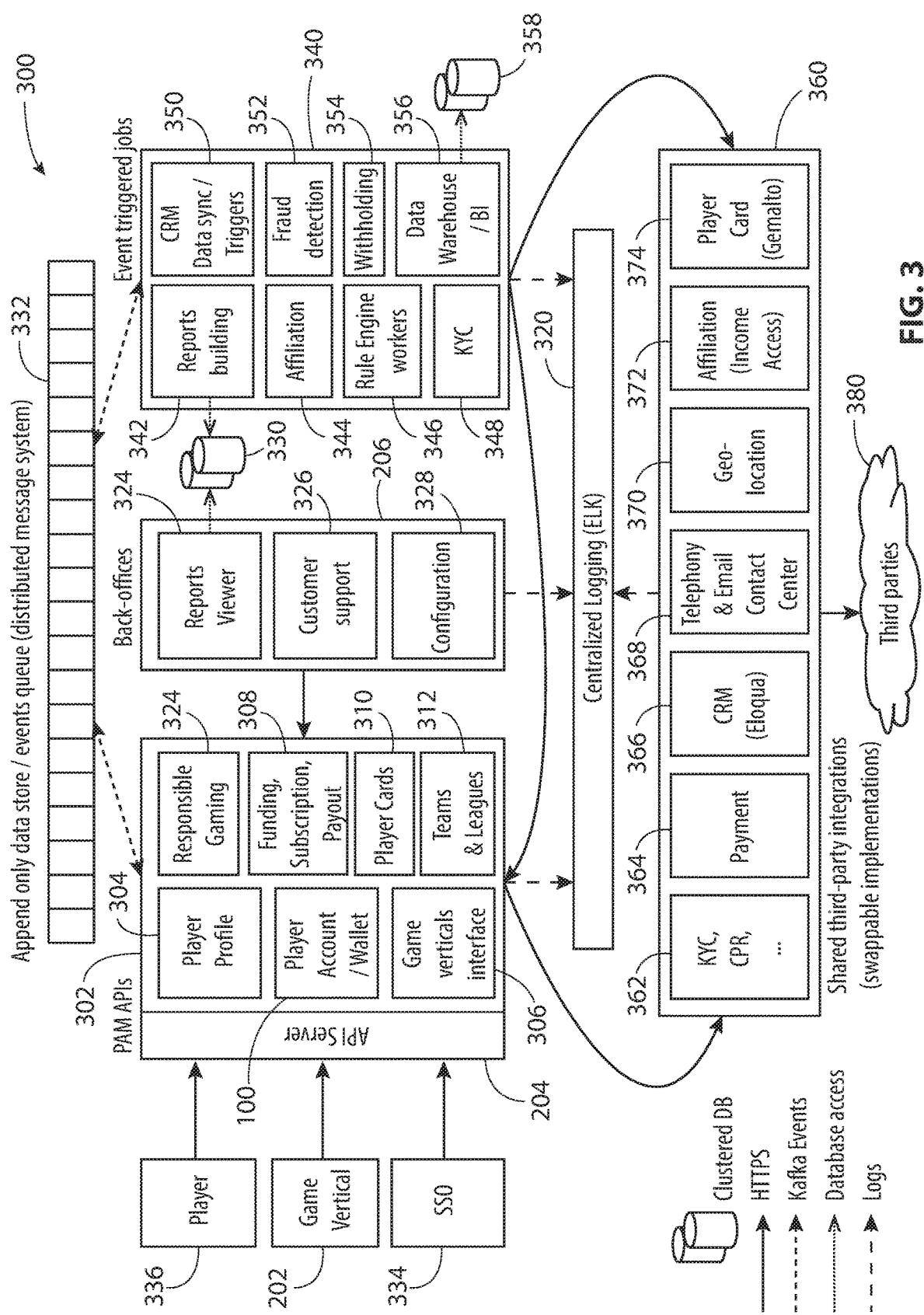
FIG. 3 is a logical architectural diagram of the player and account manager shown in FIG. 2.

Win request queue: A deposit via the Wallet Manger 102 in the event a player 336 (FIG. 3) has a win on a game of a gaming system, such as a casino gaming system, a sports betting gaming system, or a lottery gaming system. A player 336, such as shown in FIG. 3 interacts with the UWM 100 using a computer terminal over a computer network. In other words, the win request queue stores requests to deposit an amount of (real) money to a requested ledger 120*a* associated with a player. The deposited amount of money corresponds to an amount of a win awarded to the requesting player by a casino gaming system 202.

Purchase request queue: Used to purchase virtual credits. The purchase request queue stores requests to purchase a number of virtual credits 120*d* by the requested player in a gaming system 202.

Award request queue: Used to award loyalty points.

Deposit request queue: Used by the Funding Service 106 to deposit real money. The deposit request queue stores requests to deposit an amount of real money into the requested real money ledger 120*a* of the player's wallet 100.

Withdraw request queue: Used by the Funding Service 106 to request a cash withdrawal. The withdraw request queue stores requests to withdraw an amount of real money from the requested real money ledger 120*a*.

Response Queues 118

Response queues 118 are used by services to communicate with the Wallet and Funding Services 104, 106. They generally hold responses to actions initiated by these services 104, 106 that resulted in updates to balances stored in the ledgers 120. For example, a deposit by the Funding Service 106 will result in the ledger queue 120 being updated with new information that the Wallet 102 needs to update its internal balances. The real money deposit can also trigger an update of loyalty points 120*b* via the Rules Engine 114. Response queues 118 also have a sliding window for message expiration.

There are two types of response queues 118. A ledger response queue stores all actions that cause an update to any of the ledgers 120 managed by the ledger service 110, which triggers a record to be added to the ledger response queue. The wallet 102 subscribes to this ledger response queue and uses the update to update the wallet's 120 own internal running balances. Another type of response queue 118 is a responsible gaming (RG) ledger queue, which is owned by an RG service 112. All updates to a RG profile are recorded here in the RG ledger queue. The Funding Service 106 and the Wallet Service 104 can both subscribe to this RG ledger queue and use the data to update their RG counters.

Storage Queues

Storage queues 112 are managed by the Ledger Service 110. Each type of Currency support by the UWM 100 has its own master queue (120*a-e*). Extract-transform-load (ETL) daemons used to load the reporting databases subscribe to these queues 120*a-e* in a distributed database management system (130, 132*a,b*). These queues are long-term storage, and many different ETL daemons 130 can be used to populate a data warehouse 356, 358 (FIG. 3). The many different types of data storage that can be populated from the same immutable queues can be characterized as various indexes and materialized views on the same set of data. The ETL daemons 130 are not constrained by any particular data model.

In this example, there are five types of storage queues 112 managed by the Ledger Service 110:

Real money queue 120*a*—This queue holds are deposits and withdrawals of real money.

Loyalty queue 120*b*—Loyalty points accumulated across various vertical gaming systems.

Virtual credits queue 120*c*—These are credits that have been purchased, such as P4F credits (Play4Free).

Promotions queue 120*d*—Promotional credits that can be used for real money wagering on a casino gaming system, a sports betting gaming system, or a lottery gaming system.

Play money queue 120*e*—"Play" money used for tournaments. Play or virtual money is not real money.

Sync Queues

Synch queues replicate data between instances of the Wallet Service 104. When a Wallet instance updates its internal counters and balances, that data is appended to a sync queue. In addition, when a Wallet instance initializes and needs to re-synch its data to the latest or starts up with empty storage, the synch queue is used to replicate all the computed counters and balances.

If the first instances starts and cannot find a sync log, then that instance is the first Wallet to start. It should read the Ledger queue from the beginning and compute all the values. When it is finished, it should log the computed values to the sync queue for other instances to use. If two fresh instances start at the same time, the results will still be the same, as the inputs to both instances are deterministic.

Sync queues are indexed on the Wallet ID and as they always contain a full view of the Wallet counters and balances per record, these logs can be compacted by a publish-subscribe distributed messaging system.

Idempotency

In the context of wallet transactions, the transactions are characterized by "once and only once: semantics and not "at least once" semantics. All wallet 100 transactions are identified via a universally unique ID (UUID), and each service in the wallet 100 that processes any wallet transaction must keep a message store. The contents of this message store include all previously processed transaction IDs. If the service 102 sees a transaction ID twice, it simply drops the second transaction. Each wallet is also assigned a UUID relative to all other wallets.

Wallet Service 104

The Wallet Service 104 enlists the help of many microservices to manage various types of Wallets. These Wallets may belong to players or they may belong to other systems in the platform, such as a progressive service or a pari-mutuel service. The Wallet Service 104 adds value to these services by caching results and by performing various computations on the data.

The wallet 100, like all other micro services, provides its own storage. A database stores all intermediate results on the wallet 100 such as a balance, a moving average, and a last accessed timestamp. These computed values are also published to an internal synch queue described above. This synch queue is used by new instances of the Wallet Service 104 to synchronize itself with older running instances.

The SoR (System of Record) is the Ledger Service 110 but the Ledger Service 110 stores only individual transactions and does not perform any computation on the stored data. When the Wallet Service 104 gets a first time request for a player balance stored in the ledger 120, it will sum over all the positive and negative entries provided by the Ledger Service 110. It then stores this amount in its own storage. By subscribing to the Ledger Service Event Log, any new transactions are immediately seen, and the stored amounts can be updated. This method allow for new functionality to be easily added without modifying the Ledger Service 110 or any of the helper services. A request to provide a moving average (say to assist in Bonus calculations) is easily added to the Wallet Service 104.

The data returned from this service can be in the form of a JSON document. Services consuming this service read only the minimum amount of data they require. The format of the data can be based on the json-api.org description of JSON API documents.

By way of example, real money wagers, winnings, and deposits can enter the UWM 100 as 1/10,000 of the base currency, e.g., cents or pennies for Dollars, Euros, or Pounds.

In the event of storage failure or the requirement to change the storage sub-system, all data can be easily re-created by scanning over the Ledger Service 110.

Funding Service 106

The Funding Service 106 exposes a REST-based interface that can be used by a kiosk or a payment service to deposit and withdraw real money in the UWM 100. The Funding Service 106 calls the payment daemons for each deposit or withdrawal.

For each payment provider supported, a specific daemon can be developed to interface with the payment provider's gateways. These gateways can hold a secure connection open to the payment provider and communicate over queues to the Funding Service.

Additionally an event can be placed in an audit queue for all requests, responses, and errors. This audit queue can be subscribed to by any other service that is interested in real money deposits to the system 100.

The Funding Service 106 handles reversals in the event it does not receive a response from the Payment service when performing a deposit or withdrawal. It continues to try the reversal until it receives an acknowledgment.

Funding using credit or debit cards pass an encrypted token that represents a credit or debit card that has been registered with a PCI-compliant payment processor. As mentioned above, in some aspects, the Wallet Manager 102 does not breach compliance with PCI, so credit or debit card numbers are not stored and never pass through the UWM system 100.

Vault Service 108

The Vault Service 108 queries the wallet transactions and provides for a detailed history of all wallet 100 transactions, including wagers, wins, deposits, purchases, awards, and withdrawals. The Vault Service 108 can read data from a distributed storage 132$a,b$. The Vault Service 108 is a read-only service, so multiple instances of this service can run simultaneously, and exposes data obtained or derived from the storage queue 120 to the output interface of the UWM 100.

The distributed storage 132$a,b$ is populated by an ETL daemon 130 that is subscribed to all the storage queues 120. Daemons 130 can be developed to populate different databases or data warehouses utilizing different data models.

Ledger Service 110

The Ledger Service 110 manages immutable ledgers (Ledgers), such as ledgers for real money 120$a$, loyalty 120$b$, bonus 120$c$, virtual funds 120$d$ such as pari-mutuel funds, and progressive pools 120$e$. The ledgers 120 can be stored in queues in a distributed message system. Ledgers can be of type SYS (system) or USR (user). SYS-type ledgers can be progressives 120$e$ or pari-mutuel 120$d$, while USR-type ledgers are player-specific and thus can be real money 120$a$, bonus 120$b$, or loyalty 120$c$.

Each ledger storage queue 120 can have a set of meta-data associated with it. This meta-data describes the purpose of each ledger 120, its owner, its creation date, and its last accessed timestamp. All meta-data can be stored in a centralized service, such as Apache's ZOOKEEPER. The Ledger Service 110 uses the rules engine 114 to provide additional computation and conversion of ledger currencies. For example, there can be a rule in the Rules Engine 114 that indicates that a deposit over $100 should result in the Player being awarded 200 loyalty points for the gaming system 202 in which the funds were deposited.

All real money ledgers 120$a$ can store the amount as a signed integer value with, for example, seven implied decimal places. Real money wagers, winnings, and deposits can enter the system 100 as 1/10,000 of the base currency, e.g., cents or pennies for Dollars, Euros or Pounds. This amount can be further divided by 10,000,000, which can promote calculations for funding progressive wagering games or for other purposes that require additional decimal places for accuracy.

Querying the Wallet 100 for Balances, Moving Average, Etc.

The Wallet Service 104 can track a large number of statistics for each wallet 100. These include balances for each ledger 120, metrics on moving averages, minimum/maximum transactions amounts, and so forth.

Responsible Gaming (RG) counters can be maintained for all RG metrics published by the RG service 112. When a given counter matches or exceeds its set value, the wallet 100 can be locked. If the counter is a time-based counter, the wallet 100 can automatically be opened when the counters reset (such as after 24 hours). Alternately, if a win in a casino gaming system exceeds a threshold amount, the RG service 112 can automatically lock the wallet 100.

Because each wallet instance keeps an independent track of all counters and statistics, the Wallet Service 104 is always available even during a network partition.

Locking a Wallet

A wallet 100 can be locked automatically when the Responsible Gaming limits have been reached, or it can be locked programmatically, for example during self-exclusion.

Sweeping Unclaimed Funds

On a scheduled basis, unclaimed funds (Wallets whose last accessed times is over a pre-determined amount), can be swept from the real money ledgers 120$a$ of wallets 100 and converted into loyalty points 120$b$ or virtual credits 120$d$, for example. The conversion rate is handled by the Loyalty Conversion Service described below. Escheatment can be performed by transferring the unclaimed funds via ACH or debit.

Currency Service

The Currency Service can be used to support multi-currency in the UWM 100. This stand-alone service connects to an external banking or financial service to retrieve the latest exchange rate for all supported currencies. The Currency Service can be driven by the Timer Service and can subscribe to the Timer queue.

Loyalty Conversion Service

The Loyalty Conversion Service awards and converts loyalty points in the UWM 100. This stand-alone service connects to the Rules Engine 114 for rules on how to convert or award points for each gaming system 202. For example, there can be a rule that doubles reward points at certain times of day, or a rule that determines how to convert unclaimed monies to reward points. The Loyalty Conversion Service can be driven by the Timer Service and can subscribe to the Timer log.

Timer Service

The Timer Service manages Timers and utilizes a quartz engine to subscribe Timers. When a Timer fires the Timer Service will append a Timer record to the Timer queue. Other services can subscribe to these events for orchestration.

Asynchronous Communication

A distributed message system a fast, scalable, distributed, partitioned, replicated commit log service. It provides the functionality of a distributed publish-subscribe messaging system. The distributed message system is designed as a distributed system that is highly scalable, offers high throughput for both publishing and subscribing, and supports multiple subscribers and automatically balances the consumers during a failure.

The UWM 100 exploits queues to build loosely coupled and asynchronous components and services. Treating queues as first-class citizens provides for scaling and fault tolerance between components of the UWM 100.

The following applies to any queue described herein. Entries are appended sequentially to the queue. Entries are immutable and can only be appended. No edits, movements, overwriting, or deletions of any appended entry are allowed. There are no explicit message IDs in the queue. Messages in the queue are exposed by the logical offset in the queue. An identifier (ID) of a new message (entry) to be appended to the request queue 116 or the response queue 118 is computed by adding a length of a current message to its logical offset without associating any explicit message-IDs to any of the messages stored in the request queue 116 or the response queue 118. The present disclosure, in certain aspects, eliminates message IDs, opting instead to access messages computationally. Accessing messages in any queue 116, 118, 120 computationally avoids the overhead of maintaining auxiliary, seek-intensive random-access index structures that map the message IDs to the actual message locations. Messages IDs are incremental but not consecutive. To compute the ID of the next message in a queue, a length of the current message is added to its logical offset.

Transport, durability, scaling, and fault-tolerance can be offloaded to a distributed message system. The UWM 100 services can engage in a publish-subscribe pattern to communicate and fire events. Inbound request to the service can be placed in a queue. The daemons tasked with delivering these requests over an S2S protocol (server-to-server) are subscribers to these queues and are awoken whenever a new message arrives. To fulfill the micro-batching functionality, they also subscribe to a Timer queue. Depending on the types of Timers created, the Timer service will add messages to these queues when Timers expire.

Examples of Ledger Conversions

As mentioned above, the ledgers 120 support many different types of ledgers (real money, loyalty, bonus, progressives, play money, etc.) for many different types of gaming systems (casino, sports betting, lottery, social). The ledgers 120 are extensible and can support additional types of ledgers, such as bitcoin. Even within each ledger type, such as a real money ledger, the wallet 100 supports intra-ledger currency conversions, such as exchanging real money in Dollars to Euros. Within the loyalty point ledger, for example, the rules engine 114 can define internal currency conversions to a base currency. The rules engine 114 allows different ledgers 120a,b,c,d,e to be moved from one ledger to another, and the rules specify the conversion rates or exchange values, not only for a particular type of gaming system but across multiple gaming systems. For example, a bonus point in a casino gaming system may be worth more or less than a bonus point in a sports betting gaming system, and the rules engine 114 has rules quantifying a conversion rate for these different types of bonus points. Another example rule converts loyalty points to corresponding real money, such as 500 bonus points equals $50 for a first casino gaming system, but $100 for a second casino gaming system, and $250 for a sports betting gaming system. The conversions themselves can be embedded in the request call 116, such as convert $50 in real money from the casino gaming system into corresponding bonus points for a sports betting gaming system, and the rules engine 114 applies the appropriate rule to carry out the requested conversion.

Not only can the rules engine 114 specify conversion rates or exchange values, each conversion can be associated with a rule defining one or more conditions that must be satisfied to consummate the conversion. These conditions can include any one or more of a threshold deposit or withdrawal amount, a date or time range, or a physical location, for example. For example, a condition can be that during this hour, for every $5 spent, the player will be awarded 500 points, or on this day, 5× loyalty points can be earned throughout the day. Other rules can prohibit certain conversions, such as conversions between play money from a social gaming system and real money destined for use in a casino gaming system. However, conversions within a social gaming system from play money to real money, if permitted, can also be specified by a rule in the rules engine 114. The rules engine 114 can also infer actions based on the facts set forth in the queue 120.

Examples of GET and POST Methods

Details in the wallet 100 can be retrieved using a GET request. Examples include: wallet list listing all existing wallets, wallet details, a balance per ledger 120a,b,c,d,e, wallet metadata (e.g., wallet ID, title, creating time, last access time, source type), a list of transactions for a given wallet (e.g., by time interface or by offset in the queue), and a wallet funding transaction status. The parentheticals indicate at least some parameters passed with the request call.

Examples of POST requests via the wallet 100 include: create a deposit transaction (wallet ID, deposit transaction request), create a real money withdrawal transaction (wallet ID, withdraw transaction request), fund a real money wager (wallet ID, transaction details), award a win (wallet ID, transaction request, and optional payload), purchase virtual credits (wallet ID, transaction request, optional payload), spend virtual credits (wallet ID, transaction request, optional payload), purchase play money (wallet ID, transaction request, optional payload), spend play money (wallet ID, transaction request, optional payload), award loyalty points (wallet ID, transaction request, optional payload), spend loyalty points (wallet ID, transaction request, optional payload), award promotion credits (wallet ID, transaction request, optional payload), or spend promotion credits (wallet ID, transaction request, optional payload).

Player and Account Manager (PAM)

Figure 2:
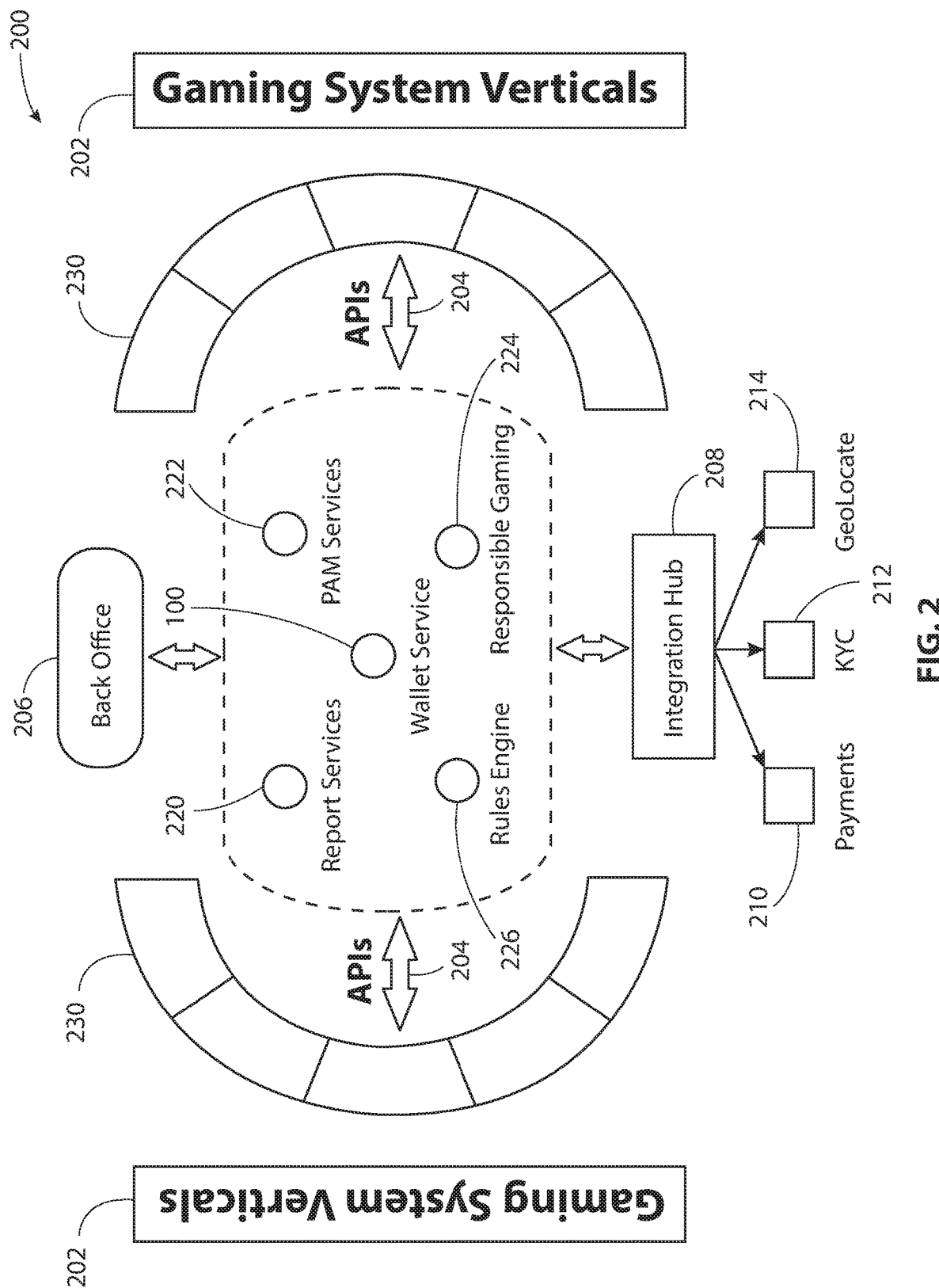
FIG. 2 is a functional block diagram of an architecture for a unified player and account manager that includes the unified wallet manager shown in FIG. 1.

Having described the UWM 100, attention will now turn to an example of an overall architecture in which the UWM 100 can exist with reference to FIG. 2. FIG. 2 illustrates a logical architecture referred to herein as a player and account manager (PAM) 200, which can support multiple gaming systems. The architecture of the PAM 200 is a layered service-based architecture with a strong emphasis on open APIs built to Level 4 REST standards. The PAM 200 provides a central integration hub 208 for a large and complex gaming platform supporting vertical multiple gaming systems 202. As used herein, software architecture is the plan for realizing non-functional requirements, and software design is the plan for realizing functional requirements.

The architecture of the PAM 200 is an event-driver design coupled with micro-services. It is deployed in a redundant and High Availability (HA) topology. Key components can scale under load as they are either stateless or use append-only queues or logs to synchronize.

The architecture splits the system among clear context boundaries, which allows the creation of specific teams to build and deploy each component. A service layer 230 is placed across these boundaries to enable component-to-component communications in an asynchronous, event-driven manner.

Meta-Architecture of the PAM 200

Overview

The meta-architecture defines architecture principals that are pervasive in the overall architecture.

PAM Architecture Principals

Leverages Open Standards

In some aspects, components of the PAM 200 favor open standards over closed standards options. Benefits include the flexibility and interoperability that exists when building a system. Using open standards allows components to be swapped out for like components support the same standard if necessary due to technology advancements or corporate requirements/restrictions.

Incorporates Free and Open Source Software

Where possible, use free components and OSS frameworks. A benefit includes the flexibility obtained from using frameworks. Another benefit is to establish a highly componentized system allowing components to expose specific interfaces for low coupling and flexible system configuration.

Support a Rich Interactive Experience

The presentation layer of the system provides the player of a gaming system 202 with a rich interactive experience. This user experience (UX) is tailored per channel and per device, and is capable of degrading gracefully.

Promote Automated Testability

A goal is to provide a high-quality system, with automated system testing that leads the system to higher quality. Automating the tests also minimizes the testing resources needed compared to manual tests. Having a robust set of tests provides safety during efforts of re-factoring to reduce or eliminate the number of regressions that occur as a result. The automated tests are an integral part of the continuous integration processes, which in turn helps provide higher overall system quality.

Each component developed can be developed using Test Driven Design (TDD) and a full suite of unit tests are available. Services, sub-systems and systems can be automatically tested via Cucumber Scripts managed by the group's SQA department.

Ensure a Scalable Share Nothing Architecture

For system components, the system can scale horizontally, keeping free of any single point of contention. A benefit is allowing the system to scale by adding additional nodes in particular component areas of the deployed system. While each node is not self-sufficient, any particular area that could become a single point of contention can be scaled horizontally to avoid bottlenecks.

A micro-service architecture for services ensures that each service only accesses local storage and this storage is not shared with other running instances. Storage can be replicated and kept synchronized across all running instances of the same service via sync queues implemented on the distributed message system. Services that are not microservices may use shared storage but this storage will be clustered.

Eliminate Resource Contention

Resource contention is the source of many problems in distributed systems. Resource contention is eliminated in the PAM 200 by utilizing single writer/multiple reader models, persistent data structures, append-only data Stores, and fact-based data models, as described above.

Duplicated Immutable Data for all Data Models

All data created and managed by the system is immutable at the System of Record (SoR) level. Copies of this data may be duplicated throughout the system and may be mutated as needed, but the original SoR data are immutable. Having the SoR immutable allows the system to fully recover and rebuild any and all data stores simply by re-processing the SoR queues.

Foster a Configurable and Repeatable Packaging and Deployment Process

In pursuit of high system quality, it is important to be able to conduct consistent and repeatable system packaging and deployments. To facilitate the deployment to different environments, configuration is required. Using a build framework and build tools provide the consistent and repeatable packaging and deployments required while allowing configuration options to be used.

For a Shared Services, and individual sub-systems, the PAM 200 supports filesystem containers. These filesystem container encapsulate the component or service and all supporting software including local storage, OS Kernel, system libraries and HTTP servers, requiring no external configuration.

Conceptual Architecture

Overview

The conceptual architecture of PAM 200 provides a high-component view of the system architecture including the relationship between planes. The overall architecture may be divided into three planes: a control plane (CP), a data plane (DP) and an integration plane (IP). The control plane is a suite of services that are event driven and loosely coupled with each other. In general, all inter-services communications are asynchronous messages that are passed over logs or queues in a distributed message system. The unified PAM 200 implements services that can call into any legacy PAM system.

Control Plane

The control plane is where all the service contracts reside. All internal and external consumers of PAM 200 functionality interact with this plane. The service graph is the primary realization of this plane. These services, including the UWM 100, are implemented as RESTful Layer 4 services, and are exposed via the API Server 204.

Data Plane

The data plane includes both a public SQL database and data warehouses and the private databases used internally by the services, including the UWM 100.

Communication/Integration Plane

This plane comprises a list of public Topics in a distributed message system that other systems can subscribe to. The data published on these topics can be used by ETL jobs to load data warehouses and other data stores. Internal sub-systems have access to additional private topics and these are used for auditing and monitoring purposes.

An example is an IRS (taxable event monitor) daemon, which subscribes to the wallet topics for player winnings over a pre-determined amount. This service can block these funds until released by a back office 206.

All communications between services takes place over these queues, such as the queues 116, 118, 120 shown in FIG. 1.

Conceptual Architecture

The Unified PAM 200 is a central hub providing gaming system player and gaming system account services to a wide range and variety of gaming system verticals 202 of different types (e.g., casino gaming system, sports betting gaming system, lottery gaming system, or social gaming system). At its core sits the UWM 100 providing real money, promotional credits, virtual credits, play money, and loyalty points to each gaming system vertical 202. Around this are services for managing player profiles 222, account history, Responsible Gaming 224, and Reporting services 220.

The bulk of these services 100, 220, 222, 224, 226 are accessed directly by the gaming system verticals 202 via the REST APIs 204. The operator has access to these services 100, 220, 222, 224, 226 and full reporting functionality from the back office 206.

Access to external services such as payment providers 210 or know-your-customer (KYC) providers 212, 348 (FIG. 3) are handled by the integration hub 208. This hub 208 exposes a common set of APIs 204 to the PAM 200 with multiple implementations that can vary on a jurisdiction-by-jurisdiction basis.

Integration Hub 208

The integration hub 208 is where are external services 210, 212, 214 are integrated. A common set of contracts are developed to represent services for payments 210, KYC 212, 348 (FIG. 3), geo-location services 214, age verification, PEP (politically exposed persons), etc. Behind each service contracts sits an implementation that is based on operator preferences or jurisdictional requirements. This protects the internal consumers of these services from changes and allows implementations to be modified or replaced based on operator requirements. The integration hub 208 allows jobs to be written to inspect payloads attached to transactions passing through the wallet 100, payloads which are transparent to the wallet 100 but meaningful to a third party 380. For example, a lottery operator can write a job to inspect payloads for lottery tickets to determine if a winning number can be matched. The wallet 100 simply exposes the payload from its store to the job through the hub 208, allowing the lottery operator to, for example, automatically deposit any lottery winnings into the player's wallet 100 in the real money ledger 120*a* or to push a congratulatory notification to the lottery winner associated with the wallet 100. Because the payload contents are transparent to the wallet 100, even links to a private network can be embedded in the payload securely. These private links can be exposed by the ETL 130 in a response call via the vault service 108.

Fraud Detection 352

Fraud detection 352 on any gaming platform is a non-trivial problem and to be effective requires a full 360 degree overview of all data within the system 200. To support this the PAM 200 logs all service requests and queries to a single append-only queue or log 332 in a distributed message system (shown in FIG. 3) and ETL jobs transform and load this data into a suitable repository from fraud analysis tools such as Splunk or SPSS.

For data specific to the PAM 200 itself, a rules engine 226 is supplied and configured to trigger alerts around unusual deposit, withdrawal, and wagering patterns.

Service Graph

The core functionality of the PAM 200 can be exposed via a hyper media service graph. A consumer of the PAM 200 services can make a REST call over HTTPS to a public entry point on the API server. By following the embedded links in each JSON document, the consumer can built a graph of every service. The topology of the services is thus dynamic and can be redeployed at runtime. Each service is a Layer 4 REST service, so services can issue re-directs and flow control directives as needed.

Back Office 206

The back office 206 can utilize a standardized user interface (UI), such as via stylesheets (CSS3). A single sign on (SSO) 334 (see FIG. 3) is used to access the pages from each back office 206, which is transparent to the user.

Responsible Gaming 224

The Responsible Gaming module 224 is a first class citizen (co-equal with the wallet service 100) within the PAM framework 200. It ensures that the gaming systems 202 are operated in a fair, secure and ethical manner.

The RG service 224 includes a REST service that exposes responsible gaming parameters (such as defined in the GLI-19 specification) to all other interested services such as the Unified Wallet Service 100, and a UI that is loaded by the back office 206 for setting these parameters.

The RG service 224 supports calling external service providers via the integration hub 208 for age verification, KYC 348 (FIG. 3), self-exclusion, OFAC checking, and so forth. These services are exposed to the module from the integration hub 208. As the providers of these services vary from jurisdiction to jurisdiction, the integration hub 208 exposes a common set of interfaces to these services 100, 220, 222, 224, 226.

Report Manager 220

The Report Manager 220 supplies at least four types of reports for the system 200: compliance reports, financial reports, betting reports, and player reports. Reports can be viewed in the back office 206 and can also be scheduled for delivery via e-mail, SharePoint or the report manager 220.

All static or fixed reports can be created with a JASPER reporting engine and stored in a central repository. Using a reporting engine adds a layer of indirection for the various data sources to be supported. Operators can create or modify reports using a reporting engine report editor, such as a JASPERREPORTS editor available from TIBCO Software, Inc.

Logical Architecture

The unified PAM 200 solution provides features to various types of clients over the HTTP protocol through an API based on REST principles.

General Principles

Unified Event Store

A backbone of the system 200 is the distributed messaging system 332 (FIG. 3), which both acts as an immutable event store, containing the full history of the system 200, and a publish-subscribe messaging mechanism that allows building reliable, replicated, fast and decoupled event-driven systems. This common data source 332 allows small services to be built, deployed and configured in an extremely modular way.

Services Collaboration

The unified PAM 200 includes multiple micro services collaborating to provide the full set of required features. Each of the services provides contracts for their respective REST APIs, as well as for the events they publish. Each service is built independently with clear boundaries.

Consumers, Producers and Decoupling

Around a distributed message system, the PAM 200 is composed of two types of processes: consumers and producers (note that each producer can also be a consumer, at least for replication). The unified PAM 200 exposes a set of REST APIs 204 handled by simple services. Those services handle the submitted data in a minimal way, storing the data in a local storage or not (depending on the micro-service), and producing events. As an example, a player registration process includes validating the request, persisting the user details in a local service storage, and emitting a "Player registration" event containing the received data. As a result, this event becomes part of the immutable history of the application (which cannot be altered).

In addition, this event can be listened to by consumers, allowing them to: synchronize the other instances of the player profile service, trigger a KYC process 348, to validate the provided data (using one of the previously described implementations of the integration hub), send the player information to the CRM services 350 (idem), trigger a welcome email in the CRM service 350, add an entry to the read models (player history, affiliation, registration report, etc.), trigger the rule engine for bonus, fraud detection 352, or any configured rule 346, feed a data warehouse 356, and so forth.

This event producer/consumer architecture allows the endpoints to be fast, extensions to be built easily (without any modification to the core of the system), and allows the application to be extremely modular and scalable.

Architecture Levels

FIG. 3 illustrates an overview of the logical architecture, which can be separated into three levels: public APIs layer 302, event-triggered or scheduled workers 340, and back office 206.

Pam 200 APIs 302

Facing the player, terminals, game verticals, SSO, or any other consumer are the public REST APIs 302. Each of the exposed resources are sitting behind the API server layer 204, which handles load balancing and routing of the requests to the appropriate service, based on configuration.

A set of micro-services is deployed to manage the different use cases. For example, the core PAM (Player Profile) 304 handles the registration of players, and stores the player's details and preferences. It also exposes resources that can be used to verify player credentials.

The Unified Wallet component 100 handles the manipulation and storage of player balances (Player Account) as described above. It also exposes a history of transactions.

The responsible gaming component 224, 324 handles the storage and retrieval of all limits, pauses, exclusions (either per player or platform wide). Those limits are enforced by the wallet service and the game verticals interface.

A game verticals interface 306 provides a unique interface to the player profile 304 and player account 100 to the gaming system verticals 202.

The funding, subscription, and payout service 308 is responsible for managing funding of account, as well as subscription and payouts. The payment methods details can be managed by the core PAM 222, 302.

The player cards 310 stores card requests from players.

The teams and leagues service 312 manages teams and leagues of one or more gaming systems 202.

Event Triggered and Scheduled Workers

A majority of the work done by the Unified PAM 200 is done in an asynchronous manner, by consumers of the event queue. While those type of workers are logically separated from the API services, most of the producers are actually part of the same micro-services as the ones providing the API resources. As an example, the worker responsible for creating the player wallet upon player registration is actually part of the player profile micro service. Those workers are a simple way of extending the behavior of the application to match specific requirements.

Some examples of workers include the following:

Reports builders 342 (ETLs): those are responsible for adding data to the reports cluster 330. Following the example given above, when a player registers a report can be filled with the event data.

Affiliation 344: this service allows sending affiliation related data to the affiliation partner. This relies on the third party hub 380, communicating via a unified interface whatever the configured affiliation partner is. Third party integrations 360 can include any of those shown in FIG. 3, such as a KYC module 212, 362, a payment module 210, 364, a third party CRM 366, a telephony and email contact center 368, a geo-location module 214, 370, an affiliation module 372, or a player card module 374. These integrations are swappable and reconfigurable.

KYC 348: periodically or after player profile information is updated, a KYC process can be triggered to validate the profile data (relying on the integration hub 208 for the specific third party implementation). Based on the partner response, the player will be modified by the KYC service 212 using the Player profile 304 API 204. As an example, the player account 100 could be closed if the KYC service 212 reports that the player is deceased.

CRM 350: Events can be used to synchronize the player database and an external CRM solution. On each player registration or player profile update event, the CRM service sends the new data to the CRM used on the platform (once again, through the integration hub 208). In the same way, configurable rules can be used to trigger emails based on the events happening on the platform.

Back Offices 206

The PAM 200 proposes a back office 206 to manage player profiles and wallets, to offer reconciliation mechanisms, to view reports via reports viewer module 324, to support customer service via a customer service module 326, and to configure the system in a configuration module 328. The back offices 206 constitute a logically independent part of the Unified PAM 200. A goal is to materialize this independence by decoupling the back office 206 from the services, relying on APIs only (but as mentioned above, parts of the back office 206 can be coupled to the services). Reporting and support can also be separated, and this separation is enforced in the applications, the reporting facilities being handled by a specific service (which relies on the ETLs and event-triggered jobs described above).

Example Computer-Implemented Method

Figure 4:
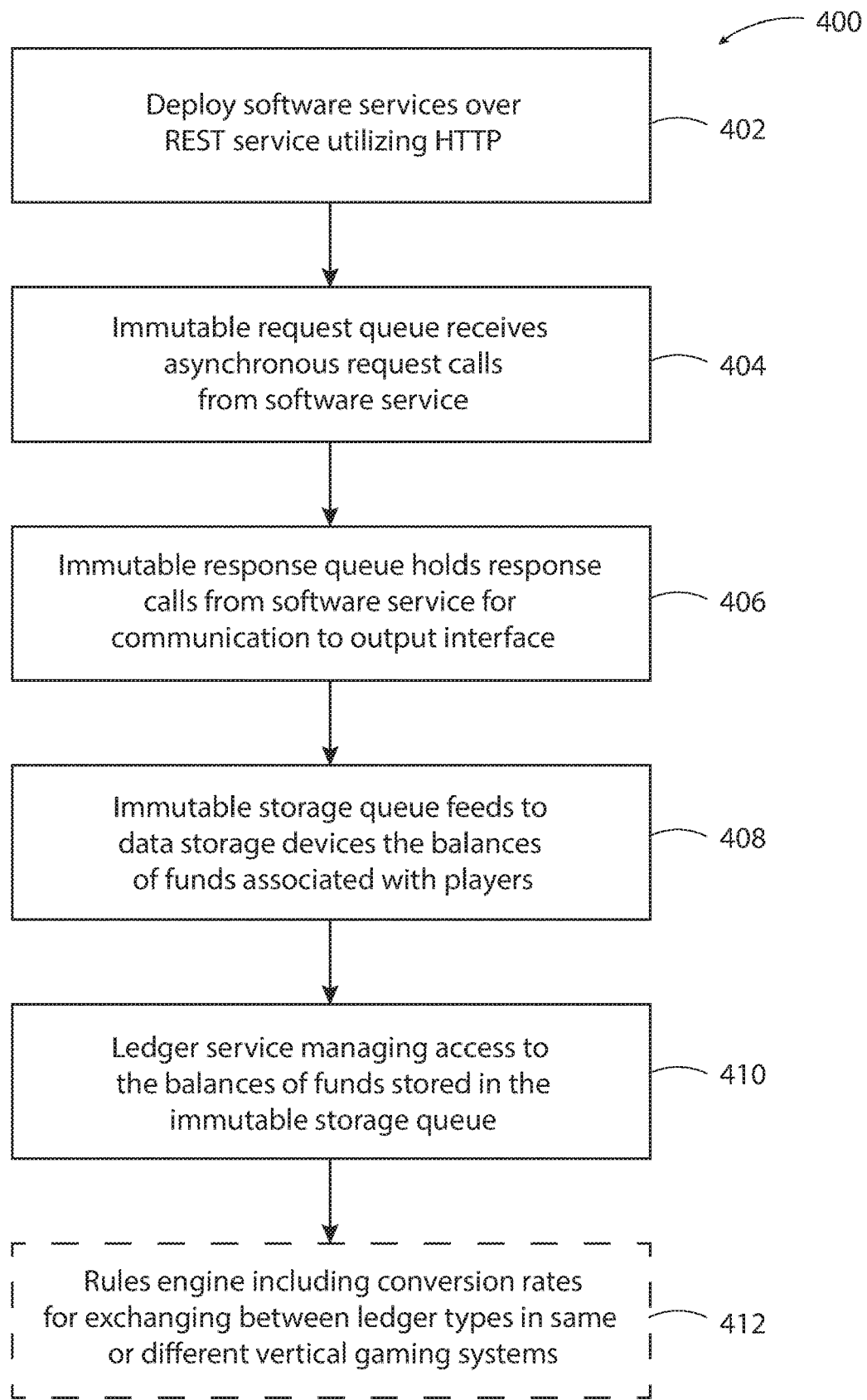
FIG. 4 is a flowchart for a data processing method that corresponds to instructions executed by a controller in accord with at least some aspects of the disclosed concepts.

FIG. 4 is an example data processing method 400 implemented on one or more computers of managing balances of funds (ledgers) associated with players 336 of one or more gaming systems 202. Multiple software services 104, 106, 108 are operated by one or more processors. These software services 104, 106, 108 are deployed over a REST service utilizing HTTP or HTTPS (402). Each of the software services 104, 106, 108 responds to request or response calls over the REST service. A request queue 116 receives asynchronous request calls from one of the software services via an input interface (404). A response queue 118 holds response calls from the software services 104, 106, 108 for communication to an output interface (406). A storage queue 120 feeds to one or more data storage devices 132 the balances of funds (ledgers) 120*a,b,c,d,e* associated with the players 336 (408). A ledger service 110 manages access to the balances of funds stored in the storage queue 120 (410). The ledger service is coupled to the storage queue 120, the response queue 118, and the request queue 116. Each of the request queue 116, the response queue 118, and the storage queue 120 is immutable such that all new entries to the queue 116, 118, 120 are appended sequentially to the queue 116, 118, 120 and no edits or deletion of any existing entries in the queue 116, 118, 120 is permitted. Any of the data storage devices herein can be mass storage devices.

Optionally, a rules engine 114 can provide rules defining cross-ledger and/or cross-gaming system conversion rates. Each conversion rate indicates a conversion exchange value between at least two funds (ledgers 120a,b,c,d,e) of different types. Each rule indicates one or more conditions that must be satisfied to convert between the funds of different types.

Each of these embodiments and obvious variations thereof is contemplated as falling within the spirit and scope of the claimed invention, which is set forth in the following claims. Moreover, the present concepts expressly include any and all combinations and subcombinations of the preceding elements and aspects.

What is claimed is:

1. A standalone digital wallet manager managing a plurality of balances of funds associated with a plurality of players of one or more gaming systems, comprising:
   one or more processors;
   one or more data storage devices utilizing one or more data models;
   an input interface;
   a plurality of software services operated by the one or more processors and deployed over a web service utilizing a hypertext transfer protocol (HTTP), each of the software services responding to calls over the web service;
   a request queue receiving asynchronous request calls from at least one of the plurality of software services via the input interface;
   a storage queue feeding the one or more data storage devices the plurality of balances of funds associated with the plurality of players of one or more gaming systems;
   a ledger service coupled to the storage queue and the request queue, the ledger service managing access to the balances of funds stored in the storage queue, wherein each of the request queue and the storage queue is immutable such that all new entries to the queue are appended sequentially to the queue and no edits or deletion of any existing entries in the queue is permitted; and
   a rules engine coupled to the ledger service, the rules engine including a plurality of conversion rates, each of the conversion rates indicating a conversion exchange value between at least two funds of different types, wherein a first of the two funds includes an amount of real money and a second of the two funds includes an amount of promotional credits.

2. The wallet manager of claim 1, wherein the rules engine further includes a corresponding rule associated with each of the conversion rates, each of the corresponding rules indicating one or more conditions that must be satisfied to convert between the at least two funds of different types.

3. The wallet manager of claim 2, wherein at least one of the conversion rates indicates a conversion exchange value between a first fund of a first type associated with a first of the one or more gaming systems and a second fund of a second type associated with a second of the one or more gaming systems.

4. The wallet manager of claim 1, the rules engine including a rule that creates a new value to add to one of the plurality of balances of funds associated with one of the plurality of players, the new value having no exchange value when created, the rule indicating at least one condition to be satisfied by the one of the plurality of players interacting with any one or more of the one or more gaming system and an extent of the new value to be added when the at least one condition is satisfied.

5. The wallet manager of claim 1, wherein one of the plurality of software services is a read-only vault service that exposes data obtained or derived from the storage queue to an output interface.

6. The wallet manager of claim 5, wherein the data is exposed via an extract, transform, and load (ETL) process operating on a distributed database management system.

7. The wallet manager of claim 1, wherein all calls relative to the input interface pass through the request queue, and wherein all messages stored in the request queue are exposed by logical offsets in the request queue.

8. The wallet manager of claim 7, wherein an identifier (ID) of a new message to be appended to the request queue is computed by adding a length of a current message to the corresponding logical offset without associating any explicit message-IDs to any of the messages stored in the request queue.

9. The wallet manager of claim 1, wherein the request queue is a plurality of request queues comprising any two or more of the following queues: a wager queue, a win queue, a purchase queue, an award queue, a deposit queue, and a withdraw queue, wherein the wager queue stores requests to deduct an amount of money from a requested one of the balances of funds associated with a requested one of the players, the deducted amount of money corresponding to an amount of a wager placed by the requested player on one of the one or more gaming systems, wherein the win queue stores requests to deposit an amount of money to a requested one of the balances of funds associated with a requested one of the players, the deposited amount of money corresponding to an amount of a win awarded to the requested player by one of the one or more gaming systems, wherein the purchase queue stores requests to purchase a number of virtual credits by the requested player in one of the one or more gaming systems, wherein the deposit queue stores requests to deposit an amount of real money into the requested one of the balances of funds, and wherein the withdraw queue stores requests to withdraw an amount of real money from the requested one of the balances of funds.

10. The wallet manager of claim 1, wherein at least one of the asynchronous request calls include a payload associated with at least one of the funds passing through the storage queue, wherein the payload includes a uniform resource locator (URL) link or a uniform resource indicator (URI) or a receipt or other indicia of a transaction involving funds.

11. The wallet manager of claim 1, wherein the one or more gaming systems includes a first gaming system of a first type and a second gaming system of a second type distinct from the first type, the first type being a casino gaming system, a lottery gaming system, a sports betting gaming system, or a social gaming system, and the second type being any other of the first type.

12. The wallet manager of claim 1, wherein the immutability of the request and storage queues allows data stored in the one or more data storage devices to be organized according to or characterized by any data model.

13. The wallet manager of claim 1, wherein data stored in the one or more data storage devices is independent of whichever data model is used to organize or characterize the data.

14. The wallet manager of claim 1, wherein the one or more data storage devices includes one or more mass storage devices.

15. A computer-implemented method of managing a plurality of balances of funds associated with a plurality of players of one or more gaming systems, the method comprising:
operating a plurality of software services by one or more processors;
deploying the plurality of software services over a web service utilizing a hypertext transfer protocol (HTTP), each of the software services responding to calls over the web service;
receiving in a request queue asynchronous request calls from at least one of the plurality of software services via an input interface;
a storage queue feeding one or more data storage devices the plurality of balances of funds associated with the plurality of players;
managing access to the balances of funds stored in the storage queue by a ledger service coupled to the storage queue and the request queue, wherein each of the request queue and the storage queue is immutable such that all new entries to the queue are appended sequentially to the queue and no edits or deletion of any existing entries in the queue is permitted; and
providing a plurality of conversion rates in a rules engine coupled to the ledger service, each of the conversion rates indicating a conversion exchange value between at least two funds of different types, wherein a first of the two funds includes an amount of real money and a second of the two funds includes an amount of promotional credits.

16. The method of claim 15, further comprising:
providing a plurality of rules in the rules engine coupled to the ledger service, the rules engine including a plurality of conversion rates, each of the corresponding rules indicating one or more conditions that must be satisfied to convert between the at least two funds of different types.

17. The method of claim 16, wherein at least one of the conversion rates indicates a conversion exchange value between a first fund of a first type associated with a first of the one or more gaming systems and a second fund of a second type associated with a second of the one or more gaming systems.

18. The method of claim 16, further comprising creating a new value by a rule operated by a rules engine coupled to the ledger service to add to one of the plurality of balances of funds associated with one of the plurality of players, the new value having no exchange value when created, the rule indicating at least one condition to be satisfied by the one of the plurality of players interacting with any one or more of the one or more gaming system and an extent of the new value to be added when the at least one condition is satisfied.

19. The method of claim 15, further comprising transferring all calls relative to the input interface through the request queue, and wherein all messages stored in the request queue are exposed by respective logical offsets in the request queue.

20. The method of claim 19, wherein an identifier (ID) of a new message to be appended to the request queue is computed by adding a length of a current message to the respective its logical offset without associating any explicit message-IDs to any of the messages stored in the request queue.

21. The method of claim 15, further comprising holding response calls in a response queue from at least one of the plurality of software services for communication to an output interface, wherein at least one of the response calls includes the payload in unaltered form.

* * * * *

UNITED STATES PATENT AND TRADEMARK OFFICE
CERTIFICATE OF CORRECTION

PATENT NO. : 10,885,741 B2
APPLICATION NO. : 16/795902
DATED : January 5, 2021
INVENTOR(S) : Duncan et al.

Page 1 of 1

It is certified that error appears in the above-identified patent and that said Letters Patent is hereby corrected as shown below:

In the Claims

Column 24, Line 31 (Claim 20), please delete "its" after "respective".

Signed and Sealed this
Second Day of March, 2021

Drew Hirshfeld
*Performing the Functions and Duties of the
Under Secretary of Commerce for Intellectual Property and
Director of the United States Patent and Trademark Office*